United States Patent [19]

Grace et al.

[11] Patent Number: 4,513,526
[45] Date of Patent: Apr. 30, 1985

[54] FISHING TACKLE ORGANIZER

[76] Inventors: Virgil Grace, 2900 E. Fourteenth St., Sioux Falls, S. Dak. 57103; Jerry E. Grace, 7900 N. Harrington, Sioux Falls, S. Dak. 57101

[21] Appl. No.: 502,007

[22] Filed: Jun. 7, 1983

[51] Int. Cl.³ ............................................. A01K 97/00
[52] U.S. Cl. .................................................... 43/57.2
[58] Field of Search ...................... 43/27.4, 57.2, 57.3

[56] References Cited

U.S. PATENT DOCUMENTS

| | | | |
|---|---|---|---|
| 2,658,300 | 11/1953 | Snyder | 43/57.2 |
| 2,667,010 | 1/1954 | Anderson | 43/57.2 |
| 2,670,563 | 3/1954 | Anderson | 43/57.2 |
| 2,804,717 | 9/1957 | Ripperdan | 43/57.2 |
| 3,818,625 | 6/1974 | Shults | 43/27.4 |
| 4,453,843 | 6/1984 | Martyniuk | 43/57.3 |

FOREIGN PATENT DOCUMENTS

1565351  5/1969  France ................. 43/57.2

Primary Examiner—Nicholas P. Godici
Assistant Examiner—M. Jordan
Attorney, Agent, or Firm—Kinney & Lange

[57] ABSTRACT

A fishing tackle organizer provides a visible and orderly display of fishing lures such as spinners and snells, which include a short fishing line having a hook at one end and an attachment loop at the other end. The organizer includes a pair of brackets which are mounted to the boat, a compartment for containing fishing accessories, a pair of shafts which are attached to opposite ends of the compartment, and a plurality of plates which are arranged in spaced apart parallel relation on the shafts. The ends of the shafts are rotatably supported by the brackets, so that the organizer can be rotated about an axis defined by the shafts. The hook end of the lure is connected to one of the plates, and the attachment loop end is connected through a bias spring to another plate. The bias spring applies a bias force which maintains the lure under tension, so that it is stored in a taut, elongated condition. The storage compartment of the organizer has a hinged top cover which is usable as a filleting board for cleaning the fish which have been caught. A support bar and a pair of clamping devices associated with the cover act as a bag holder to facilitate disposal of the fish entails when the fish are cleaned.

20 Claims, 7 Drawing Figures

FISHING TACKLE ORGANIZER

BACKGROUND OF THE INVENTION

1. Field of the Invention.

The present invention relates to fishing equipment. In particular, the present invention relates to an apparatus for organizing and storing fishing tackle and other accessories and for providing an in boat fish cleaning facility.

2. Description of the Prior Art.

One of the most popular sports activity for persons of all ages is fishing. One problem which is shared by most anglers is the storage of fishing tackle and other accessories.

The most common device used for storing fishing tackle and supplies is a tackle box, which contains various compartments for storing hooks, sinkers and other fishing tackle and supplies. While a tackle box is an extremely useful and necessary part of most anglers' fishing equipment, it can also be a source of frustration. When the angler is fishing from a boat, the tackle box is normally placed either on a seat or at the bottom of the boat. It is not at all uncommon for an angler to knock over the tackle box while it is open and spill the contents into the bottom of the boat.

In addition, a tackle box does not provide a particularly convenient type of storage for some types of fishing lures, such as spinners and snells. These devices usually consist of a short flexible fishing line (normally about three to four feet in length) which has a hook at one end and an attachment loop at the opposite end. A spinner also includes a spoon, blade or set of wings mounted on the short line to spin or revolve as the device is drawn through the water. The spinner or snell is attached by the attachment loop to the end of the main fishing line. A devoted angler will often have numerous snells and spinners of different lengths, different hook sizes and different colored spoons or beads on the short line for use in different fishing conditions.

Because of their length, spinners and snells cannot conveniently be stored in a tackle box unless they are wound into a loop. This can often result in knots or kinks in the short line, or in several spinners or snells becoming tangled with one another.

There has been a continuing need for an improved device for storing snells and spinners in an organized fashion which eliminates the danger of the spinners or snells becoming lost or damaged. In particular, there is continuing need for a device which provides a visible and orderly display of spinners and snells of different lengths, so that the angler can easily remove and replace the spinners or snells as needed.

SUMMARY OF THE INVENTION

The present invention is an apparatus which can be mounted in a boat and which stores and displays fishing lures such as spinners or snells in a visible and orderly manner. The spinners and snells are maintained in a fully extended condition, so that the likelihood of damage is minimized.

The apparatus of the present invention includes first and second brackets which are mounted to the boat in a space relationship. Shaft means rotatably supported by the first and second brackets define an axis of rotation and support first and second spaced apart, generally parallel plates between which the spinners or snells are connected.

The first plate has a plurality of circumferentially spaced apertures adjacent its periphery to permit connection to the hook ends of the spinners or snells. The loop ends of the spinners or snells are connected to the second plate by resilient connecting means. The spinners and snells are spaced from one another and are maintained in a taut, elongated condition.

In preferred embodiments of the present invention, the resilient connecting means includes a plurality of springs which are attached at one end to the second plate and which are connectable at their other end to the loop end of the spinner or snell. The springs are circumferentially spaced and are generally aligned with the apertures in the first plate, so that the spinners and snells are maintained in spaced, generally parallel relationship.

The apparatus also preferably includes a third plate which is mounted on the shaft means between the first and second plates. The third plate defines a plurality of circumferentially spaced guide passages for the plurality of springs. Each guide passage is generally aligned with one of the apertures in the first plate. A hook is preferably provided at the end of each spring for connecting the loop end of the spinner or snell to the spring. The hook is sufficiently large so that even when the spinner or snell is disconnected from the hook, the spring is retained in the guide passage. This maintains the springs in generally parallel relationship even when not in use.

In other preferred embodiments of the present invention, additional plates are mounted on the shaft means to accommodate spinners or snells of different lengths. Each of these additional plates contains circumferentially spaced apertures for connection to the hook ends of the spinners or snells.

The present invention also preferably includes a compartment which is generally coaxially aligned with the shaft means. The compartment provides storage for various fishing supplies which may be needed by the angler. The compartment also includes a hinged top cover which can be used as a fillet board so that fish can be cleaned in the boat. The fillet board includes an extendible support bar and a pair of clamping devices which are used to hold an open top of a bag alongside the fillet board. This permits easy disposal of fish entrails and the like resulting from the cleaning of the fish.

DETAILED DESCRIPTION OF THE PREFERRED EMBODIMENTS

Figure 1:
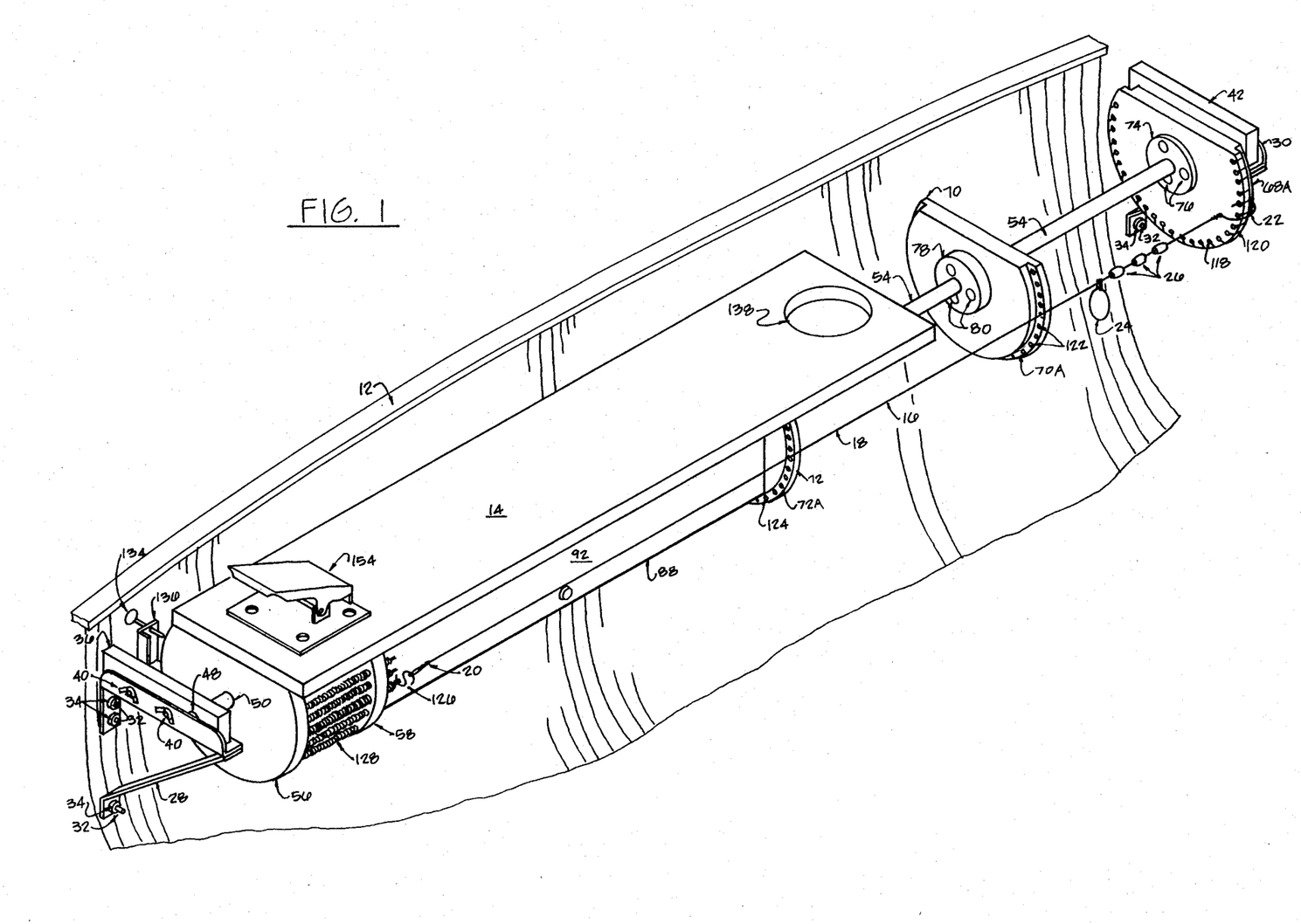
FIGS. 1 and 2 are isometric views of the fishing organizer apparatus of the present invention mounted in a boat.
Figure 2:
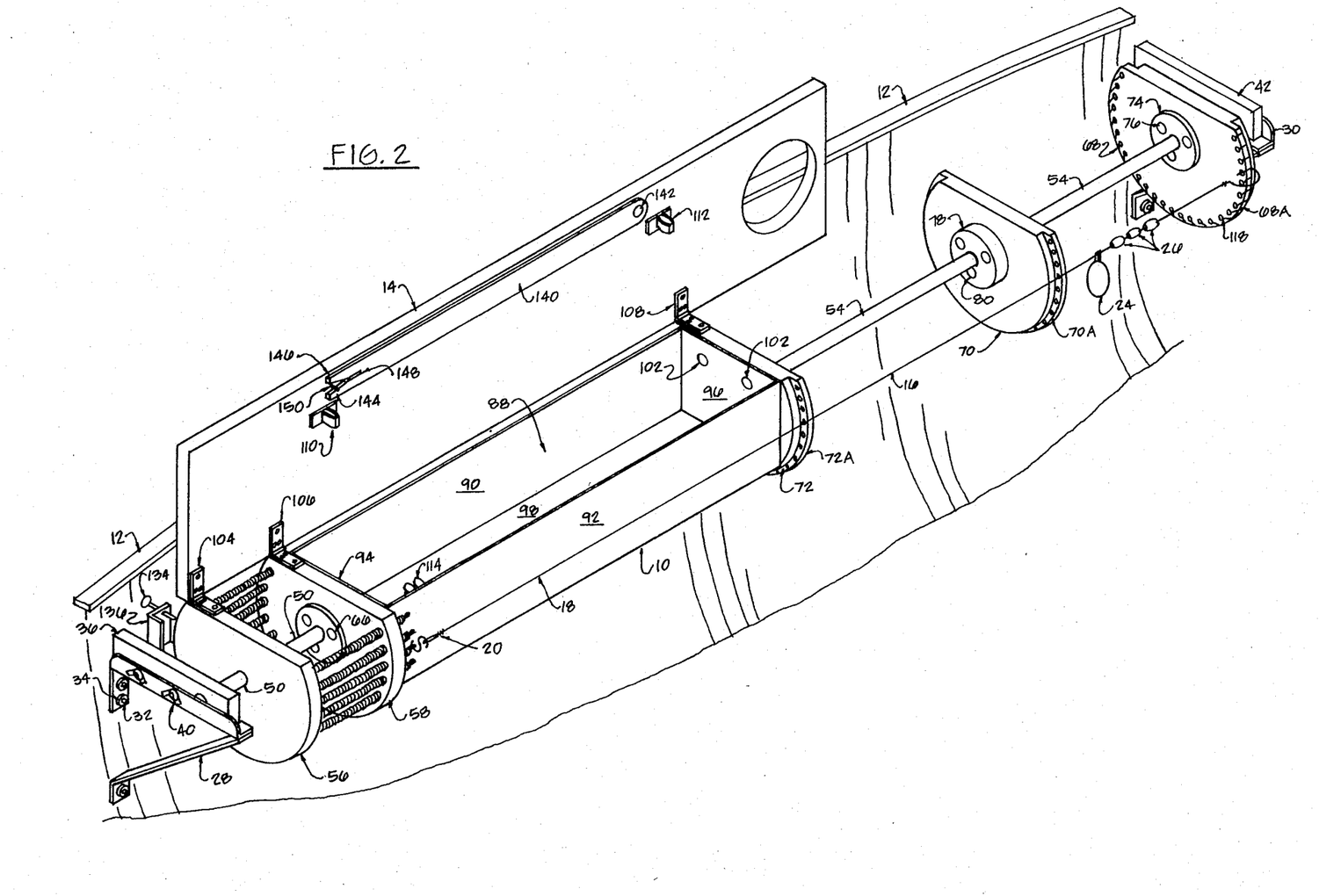

FIGS. 1 and 2 show isometric views of fishing tackle organizer 10 of the present invention mounted in fishing boat 12. FIG. 1 shows fishing tackle organizer 10 with top cover 14 in its closed position, while FIG. 2 shows fishing tackle organizer 10 and top cover 14 in its open position. For simplicity of illustration, FIGS. 1 and 2 show only a single lure (spinner 16) being stored in fishing tackle organizer 10. Under normal conditions, of course, a plurality of lures would be mounted on fishing tackle organizer 10. As illustrated in FIGS. 1 and 2, spinner 16 includes a short length of flexible line 18 having an attachment loop 20 at one end, a hood 22 at its opposite end, and spoon 24 and beads 26 mounted on line 18. An angler often will have spinners and snells of varying lengths with different combinations of spoons, beads and other fish-attracting devices mounted on the line.

Fishing tackle organizer 10 is mounted to the inner side walls of boat 10 by a pair of spaced apart brackets 28 and 30. Brackets 28 and 30 are attached to the side walls of boat 12 by suitable fasteners, such as bolts 32 and nuts 34.

Bracket 28 supports bearing block 36. Bolts 38 and wing nuts 40 attach bearing block 36 to bracket 28. Similarly, bearing block 42 is supported by bracket 30. Bolts 44 and wing nuts 46 connect bearing block 42 to bracket 30.

Figure 5:
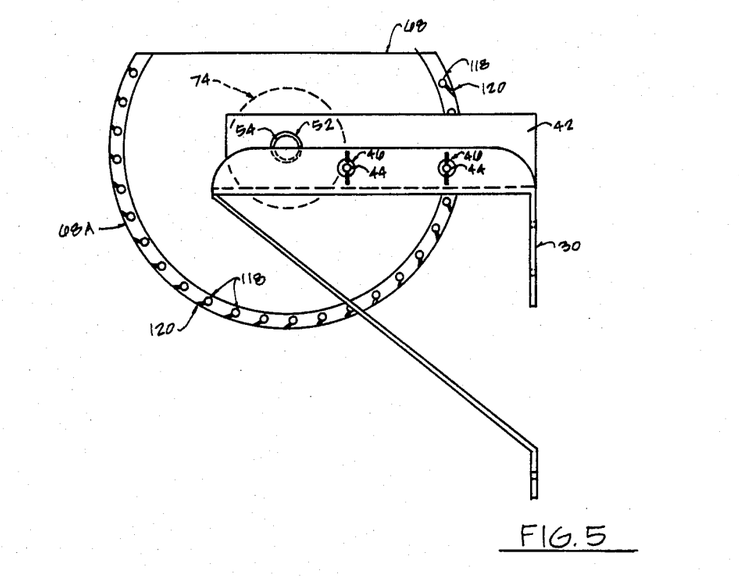
FIGS. 5 and 6 are end views of the apparatus of FIG. 1.
Figure 6:
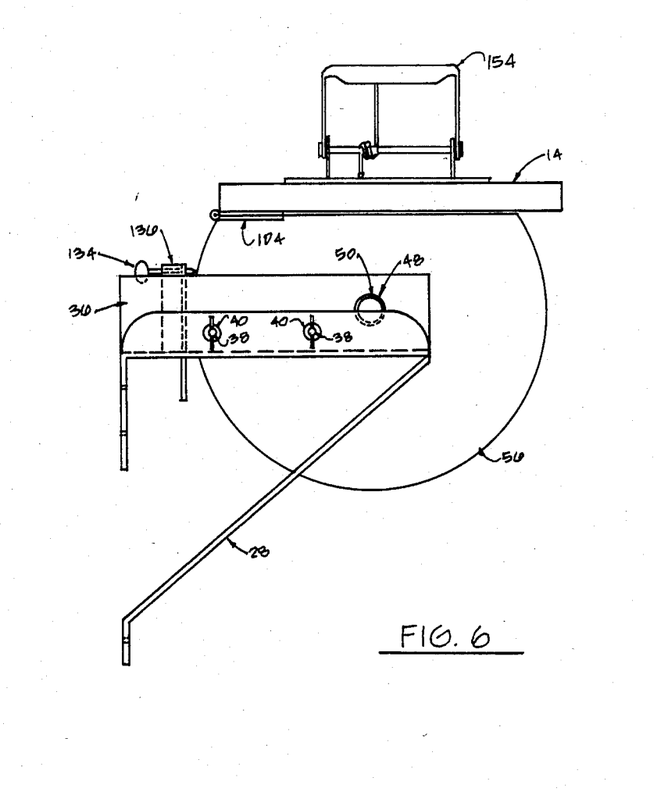

Bearing block 36 has a hole 48 for receiving the outer end of shaft 50. Similarly, bearing block 42 has a hole 52 (best shown in FIG. 5) for receiving the outer end of shaft 54. Shafts 50 and 54 are coaxially aligned, and define an axis of rotation of organizer 10.

Figure 3:
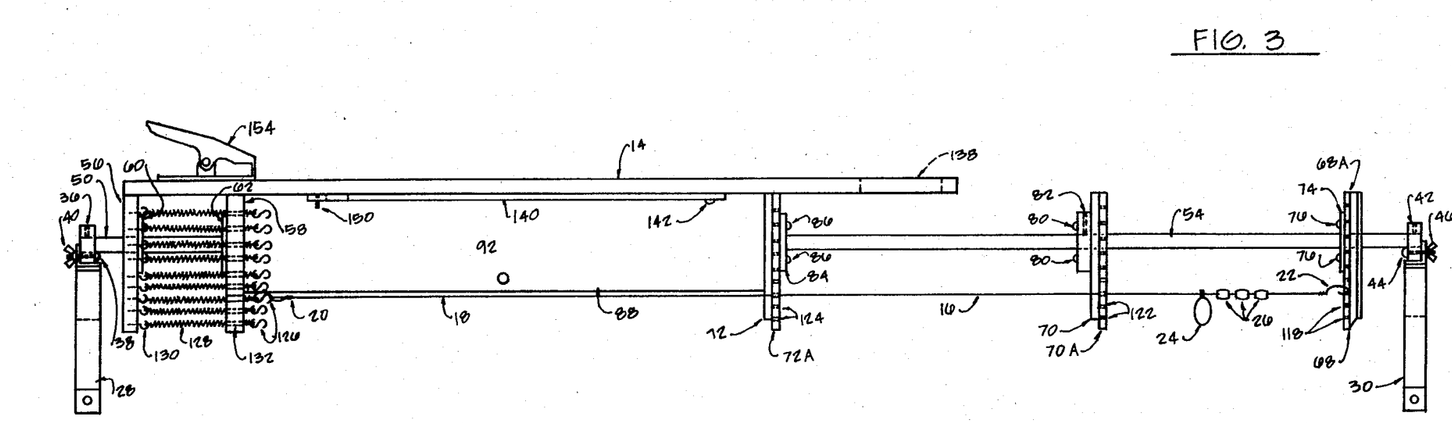
FIG. 3 is a front view of the apparatus of FIG. 1.
Figure 4:
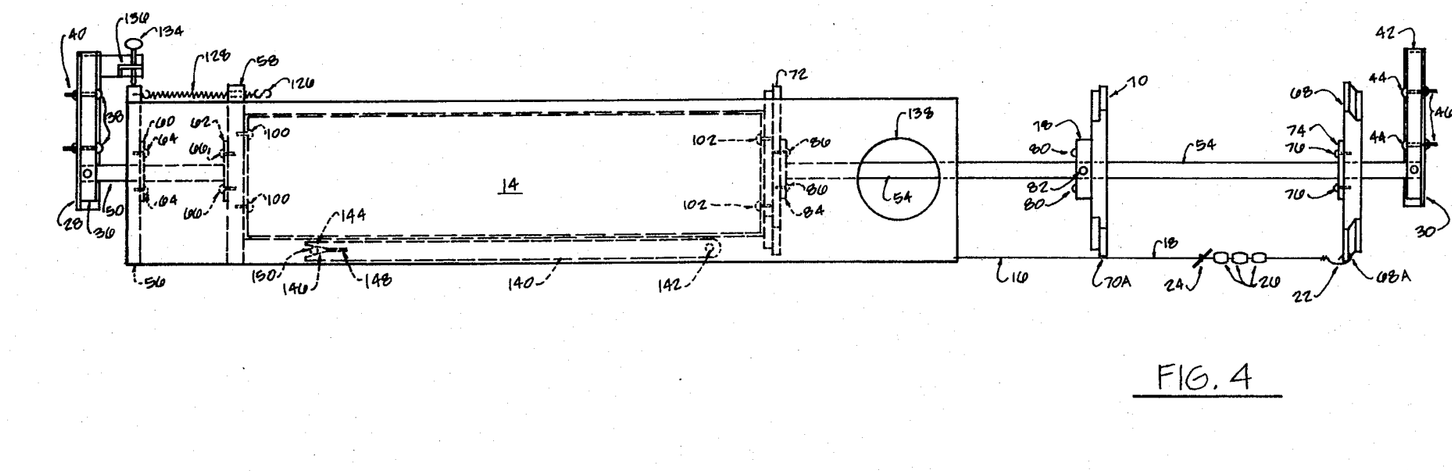
FIG. 4 is a top view of the apparatus of FIG. 1.

In the preferred embodiment shown in the Figures, organizer 10 includes plates 56 and 58 which are coaxially mounted to shaft 50 in spaced parallel relationship. As best shown in FIGS. 3 and 4, shaft 50 has a pair of fixed flanges 60 and 62 which are generally perpendicular to the axis of shaft 50 and are spaced apart from one another. Plate 56 is attached to flange 60 by screws 64, and plate 58 is attached to flange 62 by screws 66. The outer end of shaft 50 projects through plate 56, and is received by hole 48 of bearing block 36.

Organizer 10 also includes plates 68, 70 and 72 which are coaxially mounted on shaft 54 in spaced parallel relationship. Outermost plate 68 is attached to fixed flange 74 of shaft 54 by screws 76. Plate 70 is attached to movable collar 78 by screws 80. The position of collar 78 and plate 70 on shaft 54 is adjustable. Once the position of plate 70 has been selected, set screw 82 in collar 78 is tightened down to engage shaft 54 and hold collar 78 and plate 70 in a fixed position. Plate 72 is attached to fixed flange 84 of shaft 54 by screws 86.

In the preferred embodiment shown in the Figures, plates 56, 58, 68, 70 and 72 each are generally circular but have a flat top. The circular portions of plates 70 and 72 have a slightly smaller radius than plates 56, 58 and 68 so that lure 16 can be extended from plates 56, 58 to plate 68 without interference from plates 70 and 72.

Connected between plates 58 and 72 is rectangular storage container 88. As shown in the Figures, storage container 88 includes a pair of side walls 90 and 92, a pair of end walls 94 and 96 and a bottom 98. Top cover 14 provides the cover for rectangular container 88 when cover 14 is in the closed position shown in FIG. 1. Rectangular container 88 is generally coaxially aligned with shafts 50 and 54. Screws 100 (FIG. 4) connect end 94 in container 88 to plate 58. Screws 102 connect end 96 of container 88 to plate 72.

As shown in FIG. 2, hinges 104, 106 and 108 connect top cover 14 to plates 56, 58 and 72, respectively. Top cover 14 is maintained securely in a closed position by a pair of clamping devices which include male members 110 and 112 and mating female members 114 and 116, respectively. Male members 110 and 112 are attached to the bottom surface of top cover 14, while female members 114 and 116 are attached to container 88. In a preferred embodiment of the present invention, each female member 114 and 116 includes a pair of spring biased rollers which are biased toward one another, and which capture the corresponding male members 110 and 112 between the two rollers when top cover 14 is in its closed position.

Depending upon the length of lure 14, hook 22 is connected to one of the plates 68, 70 or 72. Plate 68 has a peripheral region 68A of reduced thickness which includes a plurality of circumferentially spaced holes 118. In the example shown in FIGS. 1 and 2, hook 22 is connected into one of the holes 118 of plate 68.

Each hole 118 of plate 68 has a diagonal slot 120 connecting it with the outer edge of plate 68. Diagonal slots 120 permit line 18 of lure 16 to be doubled back so as to allow longer lures to be extended over plate 68 and back to either plate 70 or 72. Diagonal slots 120 permit line 18 to be easily inserted or removed from holes 118 yet permit line 18 to be doubled back over the edge of peripheral region 68A of plate 68.

Plate 70 has a peripheral region 70A of reduced thickness in which a plurality of circumferentially spaced holes 122 are provided. In a preferred embodiment, plate 70 is aligned with respect to plate 68 so that each hole 122 is generally parallel to and inwardly spaced with respect to an axis defined by a corresponding hole 118 in plate 68.

Similarly, plate 72 has a peripheral region 72A of reduced thickness in which a plurality of circumferentially spaced holes 124 are provided. Plate 72 is preferably aligned with plates 70 and 68 so that holes 124 are generally aligned with holes 122.

Attachment loop 20 of lure 16 is connected to plate 56 by one of a plurality of resilient connecting mechanisms. Each connecting mechanism includes S hook 126, helical bias spring 128 and screw hook 130. The resilient connecting mechanisms are circumferentially spaced so as to be generally aligned with the plurality of connection holes 118, 122 and 124. S hook 126 is connected to one end of helical bias spring 128, and is positioned on the opposite side of plate 58 from plate 56. Plate 58 contains a plurality of circumferentially spaced passages 132 which are generally aligned with holes 118 in plate 68. Each bias spring 128 passes through one of the passages 132. The opposite end of bias spring 128 is connected to plate 56 through hook screw 130. S hook 126 is sufficiently large so that when no lure is connected, S hook 126 engages plate 58, but cannot pass through passage 132. This maintains all of the bias springs 128 in generally parallel circumferentially spaced relationship at all times.

Bias spring 128 applies a bias force to lure 16 to maintain lure 16 in a taut, elongated condition while being stored. This maintains all of the various lures 16 in separated, generally aligned relationship, so they will not become tangled with one another, and can easily be found by the angler when needed. The resilient bias force provided by bias springs 128 accommodate slight variations in lengths of lures 16. Larger variations in lengths of lures 16 can be accommodated by selection of one of the three plates 68, 70 and 72 to which hook 20 can be connected.

It can be seen that a wide variety of different lengths of fishing lures 16 can be accommodated with the organizer of the present invention. The lure can extend from S hook 126 to plate 72, to plate 70 or the plate 68. In addition, because of diagonal slots 120, the lure 16 can be doubled back, so that it extends from S hook 128 to plate 68, and then is doubled back to either plate 70 or plate 72.

As can be seen from the Figures, organizer 110 can accommodate a large number of fishing lures for storage. In order to provide convenient access to all of the lures, organizer 10 is rotatable about the axis defined by shafts 50 and 54. This allows the angler easy access to the lures which are mounted at the bottom of organizer 10 or on the side of organizer 10 facing boat 12. Organizer 10 can be locked into any desired rotational position by set screw 134. In the embodiment shown in the Figures, set screw 134 is threaded through upstanding member 136 of bracket 28. The distal end of set screw 34 engages the edge of plate 56 to lock organizer 10 at the desired rotational position.

In addition to providing a visible and orderly display of fishing lures such as spinners and snells, organizer 10 includes several other extremely convenient and advantageous features for the angler. In particular, top cover 14 preferably extends beyond plate 72, and includes an aperture 138 which is aligned above shaft 54. Aperture 138 is sufficiently large to receive a conventional cup or beverage container. Shaft 54 is positioned below aperture 38 to engage and support the bottom of the container when it is inserted through aperture 138. Aperture 138 also provides a handle for carrying organizer 10.

Another advantageous feature of the present invention is that it provides an in-boat fish cleaning facility which allows fast and convenient preparation of fish. Top cover 14 is used as a fish filleting board. As best shown in FIGS. 2, 3, 4 and 7, organizer 10 preferably includes an extendible support bar 140 which is pivotally connected at one end by screw 142 to the bottom surface of top cover 14. The opposite end of support bar 140 is forked, and has a pair of fingers 144 and 146 and a slot 148. Bar 140 is normally maintained in its storage position below top cover 114 by pin 150. In the storage position, which is shown in FIG. 2–4, fingers 144 and 146 are positioned on opposite sides of pin 150 to maintain bar 140 in position.

Figure 7:
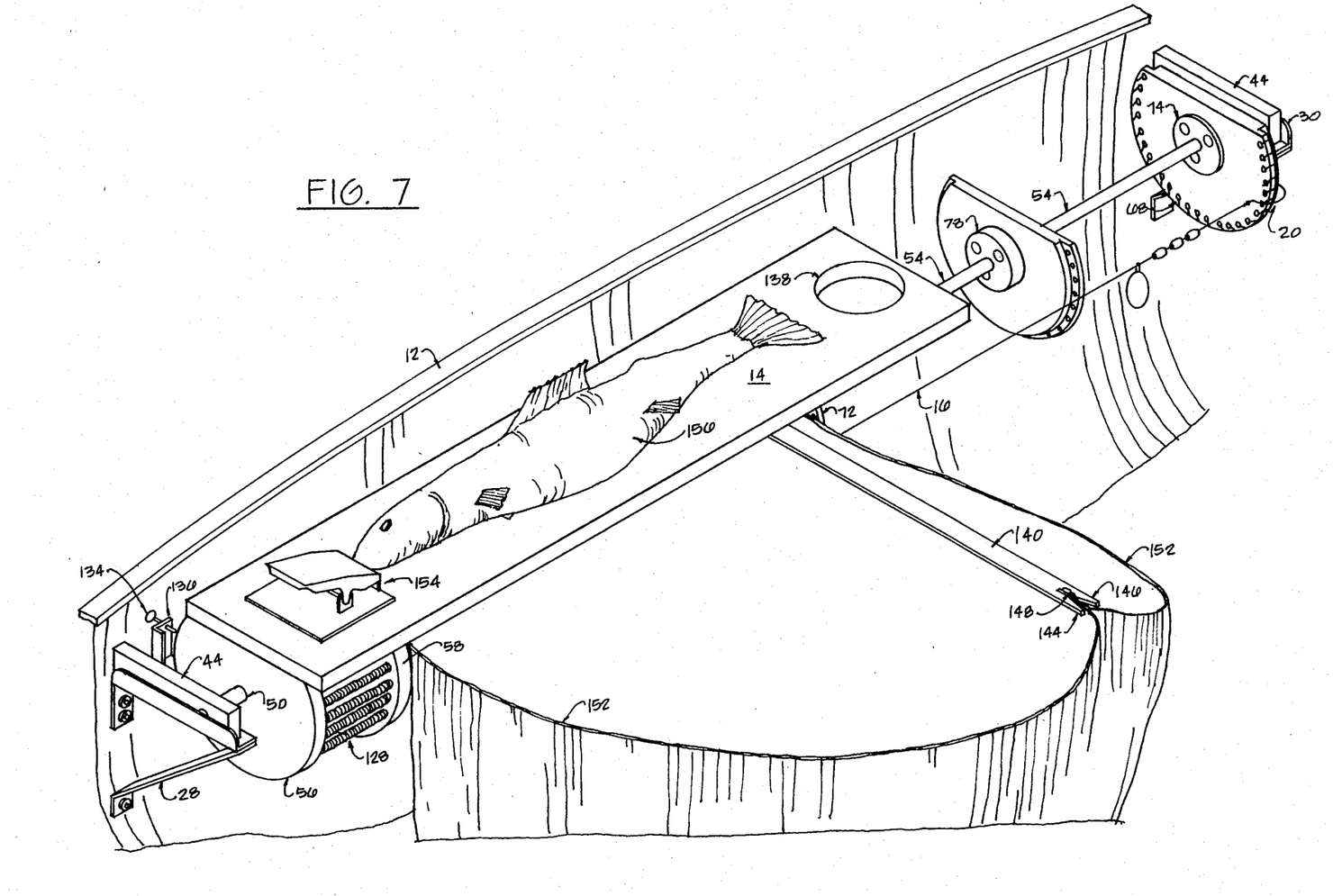
FIG. 7 is an isometric view of the apparatus of the present invention in use as an in-boat fish cleaning facility.

In FIG. 7, support bar 140 has been pivoted outward to its support position to assist in supporting the open top end of a flexible bag 152 which is used to receive the fish entrails resulting from the fish cleaning process. Fingers 144 and 146 and slot 148 hold a portion of bag 152. Other portions of bag 152 are preferably held between male member 110 and female member 114 and between male member 112 and female member 116 of the clamping mechanism.

Clamp 154 is attached to top cover 114 near one end (for clarity, clamp 154 is not shown in FIG. 4). As shown in FIG. 7, clamp 154 holds the head of fish 156 during cleaning.

The ability to clean fish in the boat using the present invention has a number of significant advantages. First, the fish can be cleaned before the angler gets out of the boat, so that the fish are still fresh when they are cleaned. Second, since the cleaning is being done in the boat, water is readily available for easy clean up. Third, the present invention provides easy waste containment and disposal, since fish entrails can be immediately disposed of in bag 152, rather than being thrown overboard or left to rot on shore.

In conclusion, the fishing tackle organizer of the present invention provides an answer to traditional problems and inconveniences associated with spinner and snell fishing. The present invention provides a visible and orderly display of spinners and snells, and permits easy removal and replacement of the spinners and snells. With the present invention, spinners and snells are no longer ruined and thrown away because they have become tangled or otherwise damaged in a tackle box. Because of the multiple plates that are used and the resilient spring connection to the lures, nearly all common lengths of lures are easily accommodated.

In addition, the storage compartment 88 provided with the present invention permits storage of replacement spinners, supplies for spinner construction, fillet knives and other assorted fishing supplies. Because the organizer 10 of the present invention is mounted to the inner side wall of the boat, the floor of the boat is kept clear of random spinners, snells and open tackle boxes. This makes fishing in the boat more convenient and comfortable.

Finally, the capability of in-boat fish cleaning allows fast and convenient preparation of the fish, easy waste containment and disposal, and allows the fish to be cleaned promptly and easily without pollution.

Although the present invention has been described with reference to preferred embodiments, workers skilled in the art will recognize that changes may be made in form and detail without departing from the spirit and scope of the invention.

What is claimed is:

1. An apparatus for mounting in a boat to store and display elongated fishing devices such as spinners and snells when the fishing devices are not in use, wherein the fishing devices have first and second ends and a flexible line extending between the first and second ends, the apparatus comprising:
   a first bracket for mounting to the boat;
   a second bracket for mounting to the boat in spaced relation to the first bracket;
   shaft means rotatably supported by the first and second brackets and defining an axis of rotation;
   a first plate mounted on the shaft means and having a plurality of circumferentially spaced apertures adjacent its periphery for connection to the first ends of the fishing devices;
   a second plate mounted on the shaft means in spaced relationship to the first plate;
   resilient connecting means for connecting the second ends of the fishing devices to the second plate while applying resilient bias force which maintains the fishing devices in a taut elongated condition; and
   a compartment coaxially aligned with and supported between the first and second plates.

2. The apparatus of claim 1 wherein the resilient connecting means comprises:
   a plurality of springs, each spring being attached at one end to the second plate and being connectable at another end to the second end of one of the fishing devices, the springs being circumferentially spaced so that each spring is generally aligned with one of the apertures in the first plate.

3. The apparatus of claim 1 and further comprising:
   third and fourth plates mounted on the shaft means between the first and second plates, supporting the compartment therebetween.

4. The apparatus of claim 3 wherein the third plate further defines a plurality of circumferentially spaced guide passages for the plurality of springs which are generally aligned with the plurality of apertures in the first plate.

5. The apparatus of claim 4 and further comprising:
a hook at the other end of each of the springs for connecting the second end of the fishing device to the spring.

6. The apparatus of claim 3 wherein:
the fourth plate is mounted on the shaft means between the first plate and the third plate.

7. The apparatus of claim 6 wherein the fourth plate has a plurality of circumferentially spaced apertures for connecting to the first ends of the fishing devices.

8. The apparatus of claim 1 wherein the first plate has a diagonal slot extending from a peripheral edge of the first plate to each of the apertures.

9. The apparatus of claim 8 and further comprising:
a fifth plate mounted on the shaft means between the first plate and the fourth plate, the fifth plate having a plurality of circumferentially spaced apertures for connection to the first ends of the fishing devices.

10. The apparatus of claim 6 wherein the shaft means comprises:
a first shaft having an outer end rotatably supported by the first bracket and an inner end attached to the fourth plate, wherein the first plate is mounted on the first shaft adjacent its outer end;
a second shaft coaxially aligned with the first shaft and having an outer end rotatably supported by the second bracket and an inner end attached to the third plate, wherein the second plate is mounted on the second shaft adjacent its outer end.

11. The apparatus of claim 3 wherein:
the third and fourth plates define ends of the compartment, and the compartment further includes sides and a bottom generally parallel to the axis, and an open top.

12. The apparatus of claim 11 and further comprising:
a top cover for covering the compartment.

13. The apparatus of claim 12 and further comprising:
hinge means for connecting the top cover with respect to the compartment to permit the top cover to be pivoted between a closed position in which the top cover covers the compartment and an open position in which the top cover permits access to interior portions of the compartment.

14. The apparatus of claim 13 and further comprising:
clamping means associated with the compartment for holding portions of an open top bag adjacent the top cover when the top cover is in the closed position; and
extendible support means carried by the top cover and extendible outward from the top cover for engaging and supporting a portion of the open top bag to permit waste disposal into the bag when fish are cleaned on the top cover.

15. The apparatus of claim 14 wherein the extendible support means comprises a support bar pivotally mounted at one end to the top cover and having a forked opposite end for engaging and holding a portion of the bag.

16. The apparatus of claim 12 and further comprising:
fish clamping means attached to the top cover for holding a portion of a fish while the fish is being cleaned on the top cover.

17. The apparatus of claim 12 wherein the top cover includes an extension which projects beyond the fourth plate toward the first plate, and wherein the extension has generally an aperture positioned above the first shaft, the aperture and the first shaft being in spaced relationship to receive and support a beverage container.

18. The apparatus of claim 1 and further comprising:
locking means for locking the shaft means in a selected rotational position with respect to the first and second brackets.

19. An apparatus for mounting in a boat to store and display elongated fishing devices such as spinners and snells when the fishing devices are not in use, wherein the fishing devices have first and second ends and a flexible line extending between the first and second ends, the apparatus comprising:
a first bracket for mounting to the boat;
a second bracket for mounting to the boat in spaced relation to the first bracket;
shaft means rotatably supported by the first and second brackets and defining an axis of rotation;
a first plate mounted on the shaft means and having a plurality of circumferentially spaced aperatures adjacent its periphery for connection to the first ends of the fishing devices;
a second plate mounted on the shaft means in spaced relationship to the first plate;
resilient connecting means for connecting the second ends of the fishing devices to the second plate while applying resilient bias force which maintains the fishing devices in a taut elongated condition;
third and fourth plates mounted on the shaft means between the first and second plates; and
a compartment extending between the third and fourth plates and having ends adjacent the third and fourth plates, having sides and a bottom generally parallel to the axis, and having an open top.

20. An apparatus for mounting in a boat to store and display elongated fishing devices such as spinners and snells when the fishing devices are not in use, wherein the fishing devices have first and second ends and a flexible line extending between the first and second ends, the apparatus comprising:
a first bracket for mounting to the boat;
a second bracket for mounting to the boat in spaced relation to the first bracket;
a first shaft having an outer end rotatably supported by the first bracket;
a first plate mounted on the first shaft adjacent its outer end and having a plurality of circumferentially spaced apertures adjacent its periphery for connection to the first ends of the fishing devices;
a second shaft coaxially aligned with the first shaft and having an outer end rotatably supported by the second bracket;
a second plate mounted on the second shaft adjacent its outer end, in spaced relationship to the first plate;
a third plate attached to the inner end of the second shaft between the first and second plates, the third plate defining a plurality of circumferentially spaced guide passages for the plurality of springs;
a fourth plate attached to the inner end of the first shaft between the first plate and the third plate;
a plurality of springs, each spring being attached at one end to the second plate and being connectable at another end to the second end of one of the fishing devices, applying a bias force which maintains the fishing devices in a taut, elongated condition, the springs further being circumferentially spaced so that each spring is generally aligned with one of the apertures in the first plate; and a compartment extending between the third and fourth plates and having ends adjacent the third and fourth plates, having sides and a bottom generally parallel to the axis, and having an open top.

* * * * *